(12) United States Patent
Duan (10) Patent No.: US 11,089,473 B2
(45) Date of Patent: Aug. 10, 2021

(54) SERVICE ACCESS, AND CONTROL METHOD AND APPARATUS THEREFOR

(71) Applicant: DATANG MOBILE COMMUNICATIONS EQUIPMENT CO., LTD, Beijing (CN)

(72) Inventor: Jianghai Duan, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 262 days.

(21) Appl. No.: 16/093,611

(22) PCT Filed: Feb. 22, 2017

(86) PCT No.: PCT/CN2017/074423
§ 371 (c)(1),
(2) Date: Oct. 12, 2018

(87) PCT Pub. No.: WO2017/177767
PCT Pub. Date: Oct. 19, 2017

(65) Prior Publication Data
US 2020/0336911 A1    Oct. 22, 2020

(30) Foreign Application Priority Data

Apr. 14, 2016   (CN) .......................... 201610232605.2

(51) Int. Cl.
*H04W 12/06* (2021.01)
*H04L 12/14* (2006.01)
(Continued)

(52) U.S. Cl.
CPC .......... *H04W 12/06* (2013.01); *H04L 63/107* (2013.01); *H04W 12/086* (2021.01); *H04W 12/69* (2021.01)

(58) Field of Classification Search
CPC . H04L 63/101; H04L 63/107; H04L 12/1403; H04L 12/66; H04L 29/06;
(Continued)

(56) References Cited

U.S. PATENT DOCUMENTS 10,838,771 B2 * 11/2020 Ljung .................. G06F 9/5044
2016/0055698 A1    2/2016 Gudmundsson et al.
(Continued)

FOREIGN PATENT DOCUMENTS

CN          1610330 A        4/2005
CN        101990204 A        3/2011
(Continued)

OTHER PUBLICATIONS

The First Chinese Office Action for Application No. 201610232605.2 dated Jun. 4, 2019, 7 pages.
(Continued)

*Primary Examiner* — Khawar Iqbal
(74) *Attorney, Agent, or Firm* — Womble Bond Dickinson (US) LLP (57) ABSTRACT

Disclosed are service access, and a control method and apparatus therefor, these being used for controlling the rights of different UE accessing different services in a local service application scenario. The service access control method comprises: a local service access control server receiving a local service access request message from a UE, wherein an identifier of a local service is carried in the local service access request message; and the local service access control server determining whether the UE has a right to access the local service according to the identifier of the local service, and sending a corresponding feedback message to the UE.

12 Claims, 4 Drawing Sheets

(51) Int. Cl.
*H04L 29/06* (2006.01)
*H04W 12/69* (2021.01)
*H04W 12/086* (2021.01)

(58) Field of Classification Search
CPC ... H04W 12/06; H04W 12/086; H04W 12/69; H04W 4/24; H04W 12/08; H04W 12/00
See application file for complete search history.

(56) References Cited

U.S. PATENT DOCUMENTS

| | | | |
|---|---|---|---|
| 2017/0034643 A1* | 2/2017 | Young | H04W 4/70 |
| 2017/0118311 A1* | 4/2017 | Frydman | H04L 67/42 |
| 2018/0035360 A1* | 2/2018 | Rasanen | H04W 48/14 |
| 2018/0041954 A1* | 2/2018 | Tamura | H04M 15/80 |
| 2018/0041958 A1* | 2/2018 | Narayanan | H04L 65/4084 |
| 2018/0077294 A1* | 3/2018 | Rasanen | H04M 15/00 |
| 2018/0212962 A1* | 7/2018 | Reznik | H04W 12/06 |
| 2018/0351824 A1* | 12/2018 | Giust | H04W 36/0022 |
| 2018/0367637 A1* | 12/2018 | Balazinski | H04L 67/02 |
| 2019/0014525 A1* | 1/2019 | Jin | H04W 48/18 |
| 2019/0034219 A1* | 1/2019 | Xu | G06F 9/5077 |
| 2019/0104434 A1* | 4/2019 | Duan | H04W 68/00 |
| 2020/0053597 A1* | 2/2020 | Takano | H04W 28/14 |
| 2020/0296181 A1* | 9/2020 | Duan | H04L 67/289 |

FOREIGN PATENT DOCUMENTS

| | | |
|---|---|---|
| CN | 103188683 A | 7/2013 |
| CN | 103986769 A | 8/2014 |
| CN | 104899518 A | 9/2015 |
| GB | 2509142 A | 6/2014 |

OTHER PUBLICATIONS

PCT International Search Report for PCT Counterpart Application No. PCT/CN2017/074423, 5 pgs. (including English translation), (dated May 5, 2017).
PCT Written Opinion of the International Searching Authority for PCT Counterpart Application No. PCT/CN2017/074423, 6 pgs. (dated May 5, 2017).
The Extended European Search Report for Application No. 17781743.4 dated Apr. 23, 2019, 11 pages.
Zhang, et al., "Mobile Edge Computing and Field That Results for 5G Low Latency Scenario," China Communications, Feb. 16, 2016, pp. 174-182, vol. 13, No. 2.

* cited by examiner

SERVICE ACCESS, AND CONTROL METHOD AND APPARATUS THEREFOR

CROSS REFERENCE TO RELATED APPLICATIONS

This patent application is a U.S. National Phase Application under 35 U.S.C. § 371 of International Application No. PCT/CN2017/074423, filed on 22 Feb. 2017, entitled SERVICE ACCESS, AND CONTROL METHOD AND APPARATUS THEREFOR, which claims the benefit of Chinese Patent Application No. 201610232605.2, filed with the Chinese Patent Office on Apr. 14, 2016, and entitled "A service access method and apparatus, and a service access control method and apparatus", which was incorporated reference in its entirety.

FIELD

The present invention relates to the field of communications, and particularly to a service access method and apparatus, and a service access control method and apparatus.

BACKGROUND

In the existing network architecture, a service platform is deployed after a core network. As the concept of a 5G network, and a demand for a service thereof are proposed, the Mobile Edge Computing (MEC) technology has emerged in response. With the MEC technology, the service platform can be deployed proximate to a mobile edge.

Service servers are categorized into local and remote service servers dependent upon the position where the service platform is really deployed, where the local service server is deployed at the access network side (e.g., the base station side), and the remote service server is deployed at the core network side, and refers to a remotely deployed service server. The service server is deployed locally so that an MEC server can offload a local service, and thus a User Equipment (UE) can access the local service locally without referring to any transmission network or core network, thus reducing a consumed bandwidth of the transmission network, shortening a service delay, and improving the experience of a user.

Particularly a plurality of service servers can be deployed locally to satisfy a variety of service demands. For example, a local video-on-demand server, an indoor positioning server, an enterprise multimedia communication server, an enterprise intranet server, etc., can be deployed. However some service, e.g., a local video-on-demand, can be provided to all the UEs, whereas some service, e.g., an enterprise intranet access, can only be provided to an authorized part of the UEs, in a real application dependent upon the characteristics of the services to be deployed, so an access of an UE to a local service shall be restricted. In the existing solution to offloading a local service, the UEs and the services cannot be distinguished from each other, so an access to a local service cannot be restricted.

Furthermore the existing solution to controlling an access to a remote service may not be applicable to the local application scenario in that the remote service is generally provided to a larger number of users in a wider area, so accesses to different services are controlled separately; and a local service is only provided to a small number of users in a local area, so an access entry to a number of services shall be controlled uniformly.

In summary, privileges of different UEs to access different services cannot be controlled in the prior art in the local service application scenario.

SUMMARY

Embodiments of the invention provide a service access method and apparatus, and a service access control method and apparatus so as to control privileges of different UEs to access different services in a local service application scenario.

An embodiment of the invention provides a service access control method including:

receiving, by a local service access control server, a local service access request message of a UE, wherein the local service access request message carries an identifier of a local service; and determining, by the local service access control server, whether the UE has a privilege to access the local service, according to the identifier of the local service, and transmitting a corresponding feedback message to the UE.

With the method according to the embodiment of the invention, when a UE requests for accessing a local service, the local service access control server controls the access of the UE, and further determines whether the UE has a privilege to access the local service, and transmits a corresponding feedback message to the UE, so that privileges of different UEs to access different services can be controlled to thereby restrict an access to a local service configured with an access privilege of a UE.

Preferably, receiving, by the local service access control server, the local service access request message of the UE includes:

receiving, by the local service access control server, the local service access request message of the UE forwarded by an MEC server.

Preferably, determining, by the local service access control server, whether the UE has a privilege to access the local service, according to the identifier of the local service includes:

referring, by the local service access control server, to preconfigured local service related information, to determine whether a local service server corresponding to the identifier of the local service needs to control an access of any UE; and when the local service server corresponding to the identifier of the local service does not need to control an access of any UE, determining, by the local service access control server, that the UE has a privilege to access the local service.

Preferably, determining, by the local service access control server, whether the UE has a privilege to access the local service, according to the identifier of the local service further includes:

when the local service server corresponding to the identifier of the local service needs to control an access of any UE, referring, by the local service access control server, to a list, of UEs allowed to access the local service, corresponding to the local service server in the preconfigured information, and when the identifier of the UE exists in the list of UEs allowed to access the local service, determining, by the local service access control server, that the UE has a privilege to access the local service.

Preferably, when it is determined that the UE has a privilege to access the local service, the feedback message includes the IP address of a local service server corresponding to the local service;

when it is determined that the UE has no privilege to access the local service, the feedback message includes information indicating that the UE fails to request an access of the local service.

Preferably, transmitting, by the local service access control server, the corresponding feedback message to the UE includes:

transmitting, by the local service access control server, the feedback message to an MEC server, so that the MEC server forwards the feedback message to the UE.

An embodiment of the invention provides another service access control method including:

receiving, by a Mobile Edge Computing (MEC) server, a data message transmitted by a User Equipment (UE) to access a local service, and obtaining a destination IP address carried in the request message to access the local service; and transmitting, by the MEC server, the data message to a local service access control server upon determining that the destination IP address is the IP address of the local service access control server, so that the local service access control server determines whether the UE has a privilege to access the local service.

Preferably, after the MEC server transmits the data message to the local service access control server, the method further includes:

receiving, by the MEC server, a data message transmitted by the local service access control server to be fed back to the UE; and determining, by the MEC server, whether the UE has a privilege to access the local service, according to the data message to be fed back to the UE, and recording a correspondence relationship between IP address information of a local service server corresponding to the local service, and IP address information of the UE, and transmitting the data message, to be fed back to the UE, to the UE, upon determining that the UE has a privilege to access the local service.

Preferably, when the UE has a privilege to access the local service, the data message to be fed back to the UE includes the IP address of the local service server corresponding to the local service; or when the UE has no privilege to access the local service, the data message to be fed back to the UE includes information indicating that the UE fails to request an access of the local service.

Preferably, the method further includes:

when the destination IP address carried in the data message, transmitted by the UE, received by the MEC server is the IP address of the local service access control server, determining, by the MEC server, whether the UE has passed access control by the local service server, and performing corresponding processing on the data message transmitted by the UE.

Preferably, when the destination IP address carried in the data message, transmitted by the UE, received by the MEC server is the IP address of the local service access control server, determining, by the MEC server, whether the UE has passed access control by the local service server, and performing corresponding processing on the data message transmitted by the UE includes:

when the destination IP address carried in the data message, transmitted by the UE, received by the MEC server is the IP address of the local service access control server, determining, by the MEC server, whether there is a pre-stored correspondence relationship between the IP address of the local service server, and the IP address of the UE, and if there is a pre-stored correspondence relationship between the IP address of the local service server, and the IP address of the UE, then determining that the UE has passed access control by the local service server, and transmitting the data message, transmitted by the UE, to the local service server; otherwise, discarding the data message transmitted by the UE.

An embodiment of the invention provides a service access method including:

determining, by a UE, a local service to be accessed; and transmitting, by the UE, a local service access request message to a local service access control server, so that the local service access control server determines whether the UE has a privilege to access the local service, wherein the local service access request message carries an identifier of the local service.

Preferably, the local service access request message further carries the identifier of the UE.

Preferably, transmitting, by the UE, the local service access request message to the local service access control server includes:

transmitting, by the UE, the local service access request message to a Mobile Edge Computing (MEC) server, so that the MEC server transmits the local service access request message of the UE to the local service access control server.

Preferably, after the UE transmits the local service access request message to the local service access control server, the method further includes: receiving a feedback message transmitted by the local service access control server; and when the UE has a privilege to access the local service, the feedback message includes the IP address of a local service server corresponding to the local service, when the UE has no privilege to access the local service, the feedback message includes information indicating that the UE fails to request an access of the local service.

Preferably, the method further includes: when the feedback message received by the UE includes the IP address of a local service server corresponding to the local service, accessing, by the UE, the local service according to the IP address of the local service server.

An embodiment of the invention provides a service access control apparatus including:

a first receiving unit configured to receive a local service access request message of a User Equipment (UE), wherein the local service access request message carries an identifier of a local service; and a first determining unit configured to determine whether the UE has a privilege to access the local service, according to the identifier of the local service, and to transmit a corresponding feedback message to the UE.

Preferably, the first receiving unit is configured:

to receive the local service access request message of the UE forwarded by a Mobile Edge Computing (MEC) server.

Preferably, the first determining unit is configured to determine whether the UE has a privilege to access the local service, according to the identifier of the local service by:

referring to preconfigured local service related information, to determine whether a local service server corresponding to the identifier of the local service needs to control an access of any UE; and when the local service server corresponding to the identifier of the local service does not need to control an access of any UE, determining that the UE has a privilege to access the local service.

Preferably, the first determining unit is configured to determine whether the UE has a privilege to access the local service, according to the identifier of the local service by:

when the local service server corresponding to the identifier of the local service needs to control an access of any UE, referring to a list, of UEs allowed to access the local service, corresponding to the local service server in the preconfigured information, and when the identifier of the UE exists in the list of UEs allowed to access the local service, determining that the UE has a privilege to access the local service.

Preferably, when the first determining unit determines that the UE has a privilege to access the local service, the feedback message includes the IP address of the local service server corresponding to the local service;

when the first determining unit determines that the UE has no privilege to access the local service, the feedback message includes information indicating that the UE fails to request an access of the local service.

Preferably, the first determining unit is configured to transmit the corresponding feedback message to the UE by:

transmitting the feedback message to an MEC server, so that the MEC server forwards the feedback message to the UE.

An embodiment of the invention provides another service access control apparatus including:

a second receiving unit configured to receive a data message transmitted by a User Equipment (UE) to access a local service, and to obtain a destination IP address carried in the request message to access the local service; and a second determining unit configured to transmit the data message to a local service access control server upon determining that the destination IP address is the IP address of the local service access control server, so that the local service access control server determines whether the UE has a privilege to access the local service.

Preferably, after the data message is transmitted to the local service access control server, the second determining unit is further configured:

to receive a data message transmitted by the local service access control server to be fed back to the UE; and to determine whether the UE has a privilege to access the local service, according to the data message to be fed back to the UE, and to record a correspondence relationship between IP address information of a local service server corresponding to the local service, and IP address information of the UE, and to transmit the data message, to be fed back to the UE, to the UE, upon determining that the UE has a privilege to access the local service.

Preferably, when the UE has a privilege to access the local service, the data message to be fed back to the UE includes the IP address of the local service server corresponding to the local service; or when the UE has no privilege to access the local service, the data message to be fed back to the UE includes information indicating that the UE fails to request an access of the local service.

Preferably, the second determining unit is further configured:

when the destination IP address carried in the data message, transmitted by the UE, received by the second receiving unit is the IP address of the local service access control server, to determine whether the UE has passed access control by the local service server, and to perform corresponding processing on the data message transmitted by the UE to access the local service.

Preferably, the second determining unit is configured to determine whether the UE has passed access control by the local service server, and to perform corresponding processing on the data message transmitted by the UE by:

determining whether there is a pre-stored correspondence relationship between the IP address of the local service server, and the IP address of the UE, and if there is a pre-stored correspondence relationship between the IP address of the local service server, and the IP address of the UE, determining that the UE has passed access control by the local service server, and transmitting the data message, transmitted by the UE, to the local service server; otherwise, to discard the data message transmitted by the UE.

An embodiment of the invention provides a service access apparatus including:

a first unit configured to determine a local service to be accessed; and a second unit configured to transmit a local service access request message to a local service access control server, so that the local service access control server determines whether the UE has a privilege to access the local service, wherein the local service access request message carries an identifier of the local service.

Preferably, the local service access request message further carries the identifier of the UE.

Preferably, the second unit is configured:

to transmit the local service access request message to a Mobile Edge Computing (MEC) server, so that the MEC server transmits the local service access request message of the UE to the local service access control server.

Preferably, after the local service access request message is transmitted to the local service access control server, the second unit is further configured to receive a feedback message transmitted by the local service access control server; and when the UE has a privilege to access the local service, the feedback message includes the IP address of a local service server corresponding to the local service, when the UE has no privilege to access the local service, the feedback message includes information indicating that the UE fails to request an access of the local service.

Preferably, the second unit is further configured:

when the received feedback message includes the IP address of the local service server corresponding to the local service, to access the local service according to the IP address of the local service server.

DETAILED DESCRIPTION OF THE EMBODIMENTS

Embodiments of the invention provide a service access method and apparatus, and a service access control method and apparatus so as to control privileges of different UEs to access different services in a local service application scenario.

In order to make the objects, technical solutions, and advantages of the invention more apparent, the invention will be described below in further details with reference to the drawings and the embodiments thereof. It shall be appreciated that the particular embodiments to be described are merely intended to illustrate the invention, but not intended to limit the invention thereto.

Figure 1:
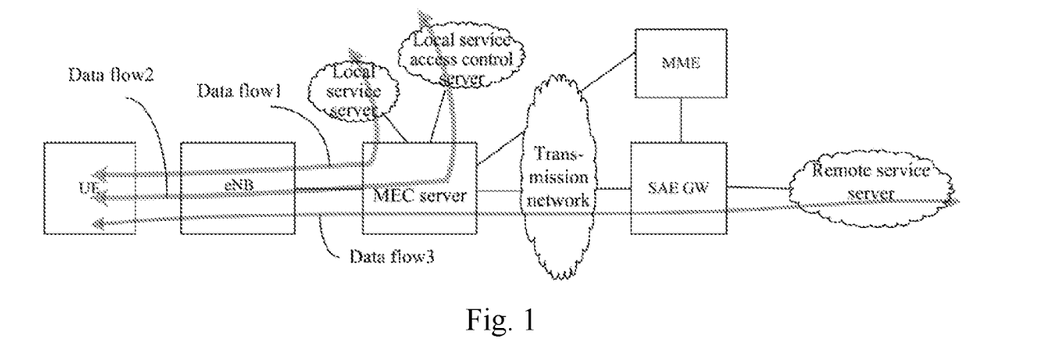
FIG. 1 is a schematic diagram of a network architecture, and service data flows thereof, according to an embodiment of the invention.

FIG. 1 is a schematic diagram of a network architecture, and service data flows thereof, according to an embodiment of the invention.

In FIG. 1, an MEC server, an evolved Node B (eNB), a local service server, and a local service access control server are deployed at the same network level, i.e., proximate to a mobile edge, and the MEC server is connected respectively with the eNB, the local service server, and the local service access control server; and an Evolved Packet Core (EPC) side includes a Mobility Management Entity (MME) and a System Architecture Evolution Gateway (SAE-GW), a remote service server behind the EPC is deployed at a higher network level (e.g., in a core equipment room), and the MEC server is connected in series on an S1 interface between the eNB and the EPC, and connected with the EPC over a transmission network (e.g., a PTN network).

Furthermore it shall be noted that the local service access control server and the MEC server can be really deployed so that they are arranged together instead of being arranged separately, that is, the local service access control server and the MEC server are arranged in the same device.

As denoted in the network architecture, a data flow 1 and a data flow 2 are local service data flows, and a data flow 3 is a remote service data flow.

In the network architecture, the local service access control server is newly arranged to control an access of a UE to a local service, that is, to determine for a local service configured with an access privilege of a UE whether a UE requesting for accessing the local service has a privilege to access the local service, and if so, to allow the UE to access the local service;

otherwise, to reject the UE for accessing the local service.

The technical solution according to the embodiment of the invention will be introduced below as a whole.

In the first step, the UE decides to access some local service, and requests for accessing the local service, at a preset unified access entry. Particularly the UE transmits a local service access request message to the MEC server, and the MEC server offloads the local service, and forwards the local service access request message of the UE to the local service access control server, where a destination IP address carried in the local service access request message by default is the IP address of the local service access control server, and the local service access request message further carries the identifier of the local service, and the identifier of the UE.

For example, the preset unified access entry above can be to start a local application installed in advance on the UE, and to click on the local service to be accessed by the requesting UE, and at this time, the UE requests by default for being connected with the local service access control server, so that the local service access control server determines whether the UE has a privilege to access the local service.

Preferably. the UE obtains the identifier of the local service as follows:

the UE determines the identifier of the local service according to a pre-created relationship between the local service, and the identifier of the local service.

Preferably the UE obtains the identifier of the UE as follows:

the UE obtains the identifier of the UE via an interface between an application stratum and a non-access stratum, and for example, the identifier of the UE can be an International Mobile Subscriber Identity (IMSI), a Mobile Subscriber Integrated Services Digital Network Number (MSISDN), etc., or of course, it can be other identification information, although the embodiment of the invention will not be limited thereto.

Figure 2:
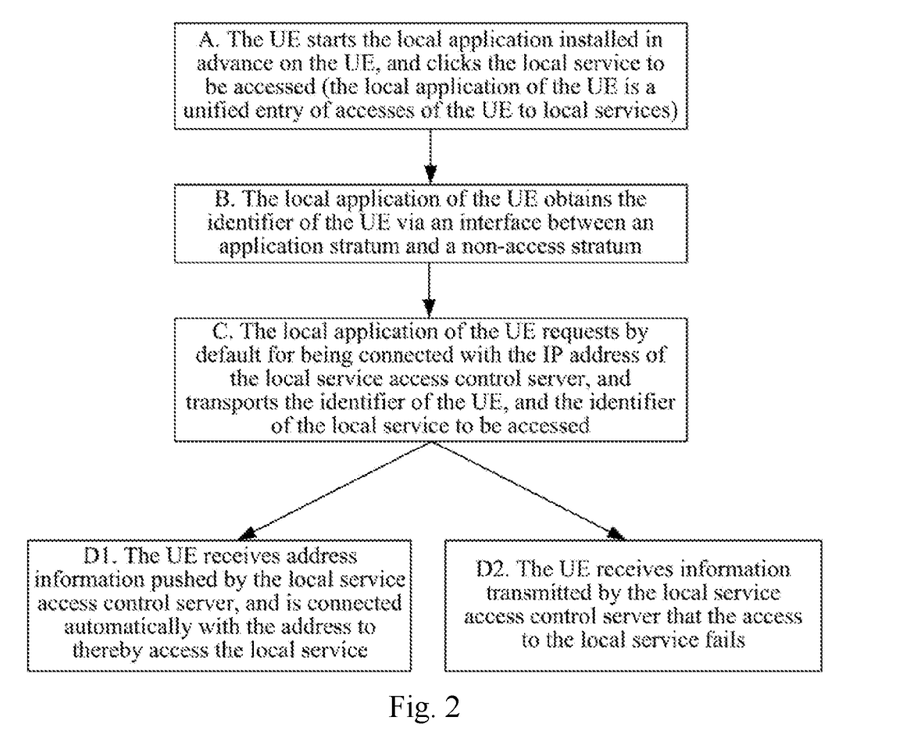
FIG. 2 is a schematic flow chart of requesting by a UE for accessing a local service according to an embodiment of the invention.

Referring to FIG. 2 which is a schematic flow chart of requesting by the UE for accessing the local service according to an embodiment of the invention, the flow particularly includes the following steps:

A. The UE starts the local application installed in advance on the UE, and clicks the local service to be accessed;

B. The local application of the UE obtains the identifier of the UE, e.g., an IMSI, an MSISDN, etc., via an interface between an application stratum and a non-access stratum;

C. The local application of the UE requests by default for being connected with the IP address of the local service access control server, and transports the identifier of the UE, and the identifier of the local service to be accessed; and if they are verified by the local service access control server, then the flow will proceed to the step D1; otherwise, the flow will proceed to the step D2; and D1. The UE receives address information pushed by the local service access control server, and is connected automatically with the address to thereby access the local service, or D2. The UE receives information transmitted by the local service access control server that the access to the local service fails.

In the second step, the MEC server receives the local service access request message of the UE, and then determines that the destination IP address in the local service access request message is the IP address of the local service access control server, so the MEC server forwards the local service access request message of the UE to the local service access control server.

In the third step, the local service access control server receives the local service access request message of the UE, and then control an access of the UE to the local service. If it is determined that the UE has a privilege to access the local service, then it will transmit a feedback message including IP address information of a local service server corresponding to the local service to the MEC server, and the MEC server will forward the feedback message to the UE; or if it is determined that the UE has no privilege to access the local service, then it will transmit to the MEC server a feedback message including information that the request transmitted by the UE to access the local service fails, and the MEC server will forward the feedback message to the UE.

Particularly, the local service access control server can be preconfigured with IP address information of respective local service servers which are deployed locally, and a list of UEs allowed to access the respective local service servers as depicted in Table 1. Furthermore the IP address information of the respective local service servers, and the list of UEs allowed to access the respective local service servers, configured in the local service access control server can be configured by an Operation and Maintenance (OM) entity, for example.

TABLE 1

| Local service identifier | Local service server address | Access cotnrol or not | List of allowed UE |
|---|---|---|---|
| Local service identifier$_1$ | Local service server IP$_1$ | Yes | {UE identifier$_1$, UE identifier$_2$ ...} |
| Local service identifier$_2$ | Local service server IP$_2$ | No | |
| Local service identifier$_3$ | Local service server IP$_3$ | Yes | {UE identifier$_1$, UE identifier$_2$ ...} |
| Local service identifier$_4$ | Local service server IP$_4$ | No | |
| ... | ... | ... | ... |

In this way, the local service access control server can refer to the preconfigured local service related information (e.g., in Table 1) according to the identifier of the local service carried in the local service access request message of the UE, and determine whether the local service server corresponding to the identifier of the local service needs to control an access of any UE, upon reception of the local service access request message. If the item of "Access control or not" corresponding to the local service server in the preconfigured information is "No", then the local service access control server will determine that the local service server does not need to control an access of any UE, that is, the UE has a privilege to access the local service, so the local service access control server pushes IP address information of the local service server corresponding to the local service; and if the item of "Access control or not" corresponding to the local service server in the preconfigured information is "Yes", then the local service access control server will determine that the local service server needs to control an access of any UE, and further refer to the list, of UEs allowed to access the local service, corresponding to the local service server in the preconfigured local service related information (e.g., in Table 1) according to the identifier of the UE carried in the local service access request message, and if the identifier of the UE exists in the list of UEs allowed to access the local service, then the local service access control server will determine that the UE has a privilege to access the local service, so the local service access control server pushes IP address information of the local service server corresponding to the local service; otherwise, the local service access control server will determine that the UE has no privilege to access the local service, so the local service access control server transmits the information to the UE that the request for access the local service fails.

In the fourth step, the MEC server determines whether the UE passes the access control (that is, whether the UE has a privilege to access the local service), according to the feedback message, corresponding to the request message of the UE to access the local service, transmitted by the local service access control server upon reception of the feedback message, and if so, then the MEC server will record a correspondence relationship between the IP address information of the local service server corresponding to the local service to be accessed by the UE, and the IP address information of the UE, and forward the feedback message to the UE; otherwise, the MEC server will forward the feedback message directly to the UE without making any record.

In the fifth step, the UE receives the feedback message, corresponding to the local service access request message of the UE, transmitted by the local service access control server, and forwarded by the MEC server, and if the feedback message includes the IP address of the local service server corresponding to the local service to be accessed by the requesting UE, then the UE will access the local service according to the IP address.

Figure 3:
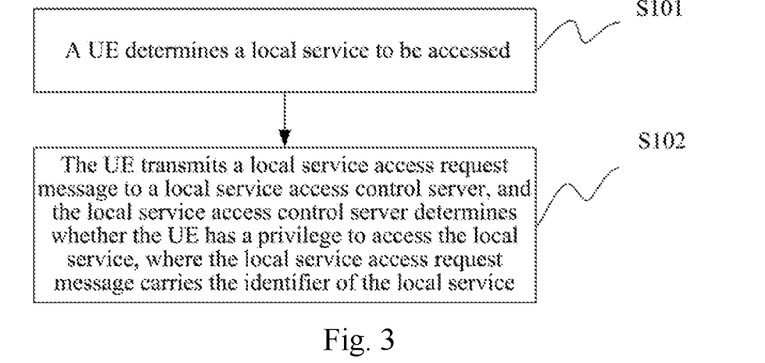
FIG. 3 is a schematic flow chart of a service access method according to an embodiment of the invention.

Accordingly referring to FIG. 3, a service access method at the UE side according to an embodiment of the invention includes the following steps:

S101. A UE determines a local service to be accessed; and

S102. The UE transmits a local service access request message to a local service access control server, and the local service access control server determines whether the UE has a privilege to access the local service, where the local service access request message carries the identifier of the local service.

Preferably, the local service access request message further carries the identifier of the UE.

Preferably, the UE transmits the local service access request message to the local service access control server as follows:

the UE transmits the local service access request message to a Mobile Edge Computing (MEC) server, and the MEC server transmits the local service access request message of the UE to the local service access control server.

Preferably, after the UE transmits the local service access request message to the local service access control server, the method further includes: receiving by the UE a feedback message transmitted by the local service access control server.

When the UE has a privilege to access the local service, the feedback message includes the IP address of a local service server corresponding to the local service.

When the UE has no privilege to access the local service, the feedback message includes the information indicating that the UE fails to request an access of the local service.

Preferably, when the feedback message received by the UE includes the IP address of the local service server corresponding to the local service, the UE accesses the local service according to the IP address of the local service server.

Figure 4:
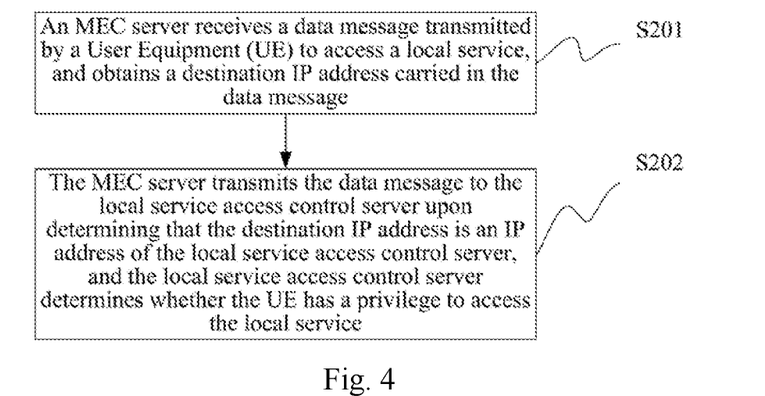
FIG. 4 is a schematic flow chart of a service access control method according to an embodiment of the invention.

Referring to FIG. 4, a service access control method at the MEC server side according to an embodiment of the invention includes the following steps:

S201. An MEC server receives a data message transmitted by a User Equipment (UE) to access a local service, and obtains a destination IP address carried in the data message; and S202. The MEC server transmits the data message to the local service access control server upon determining that the destination IP address is the IP address of the local service access control server, and the local service access control server determines whether the UE has a privilege to access the local service.

Preferably, after the MEC server transmits the data message to the local service access control server, the method further includes:

the MEC server receives a data message transmitted by the local service access control server to be fed back to the UE; and the MEC server determines whether the UE has a privilege to access the local service, according to the data message to be fed back to the UE, and records a correspondence relationship between IP address information of a local service server corresponding to the local service, and IP address information of the UE, and transmits the data message, to be fed back to the UE, to the UE, upon determining that the UE has a privilege to access the local service.

Preferably, when the UE has a privilege to access the local service, the data message to be fed back to the UE includes the IP address of the local service server corresponding to the local service; or when the UE has no privilege to access the local service, the data message to be fed back to the UE includes information indicating that the UE fails to request an access of the local service.

Preferably, the method further includes:

when the destination IP address carried in the data message, transmitted by the UE to access the local service, received by the MEC server is the IP address of the local service access control server, the MEC server determines whether the UE has passed access control by the local service server, and performs corresponding processing on the data message transmitted by the UE to access the local service.

Stated otherwise, in the embodiment of the invention, the UE to initially access the local service needs to request for accessing the local service, at a preset unified access entry (e.g., to start a local application), where the request carries the IP address of the local service access control server by default, and if the UE is verified by the local service access control server (that is, the UE passes access control of the local service server corresponding to the local service to be accessed by the requesting UE), then the local service will be accessible to the UE. At this time, the MEC server records a correspondence relationship between the local service server corresponding to the local service to be accessed by the requesting UE, and the IP address of the UE, that is, the MEC server records both the IP address of the local service server, and the IP address of the UE, and create their correspondence relationship. In this way, if the UE which has started the local application above accesses the local service again, or exchanges service data repeatedly with the local service sever corresponding to the local service, then the UE will carry the IP address of the local service server corresponding to the local service directly in the request, and the MEC server will determine whether the UE has passed access control by the local service server, and perform corresponding processing on the request message transmitted by the UE to access the local service.

Preferably, when the destination IP address carried in the data message, transmitted by the UE to access the local service, received by the MEC server is the IP address of the local service access control server, the MEC server determines whether the UE has passed access control by the local service server, and performs corresponding processing on the data message transmitted by the UE to access the local service, as follows:

when the destination IP address carried in the data message, transmitted by the UE to access the local service, received by the MEC server is the IP address of the local service access control server, the MEC server determines whether there is a pre-stored correspondence relationship between the IP address of the local service server, and the IP address of the UE, and if there is a pre-stored correspondence relationship between the IP address of the local service server, and the IP address of the UE, then the MEC server will determine that the UE has passed access control by the local service server, and transmit the data message, transmitted by the UE to access the local service, to the local service server; otherwise, the MEC server will discard the data message transmitted by the UE to access the local service.

As can be apparent from the discussion above about the service access control method at the MEC server side, the MEC server generally functions to offload a local service, that is, to forward data. A general flow of processing by the MEC server a local service data message will be given below.

Figure 5:
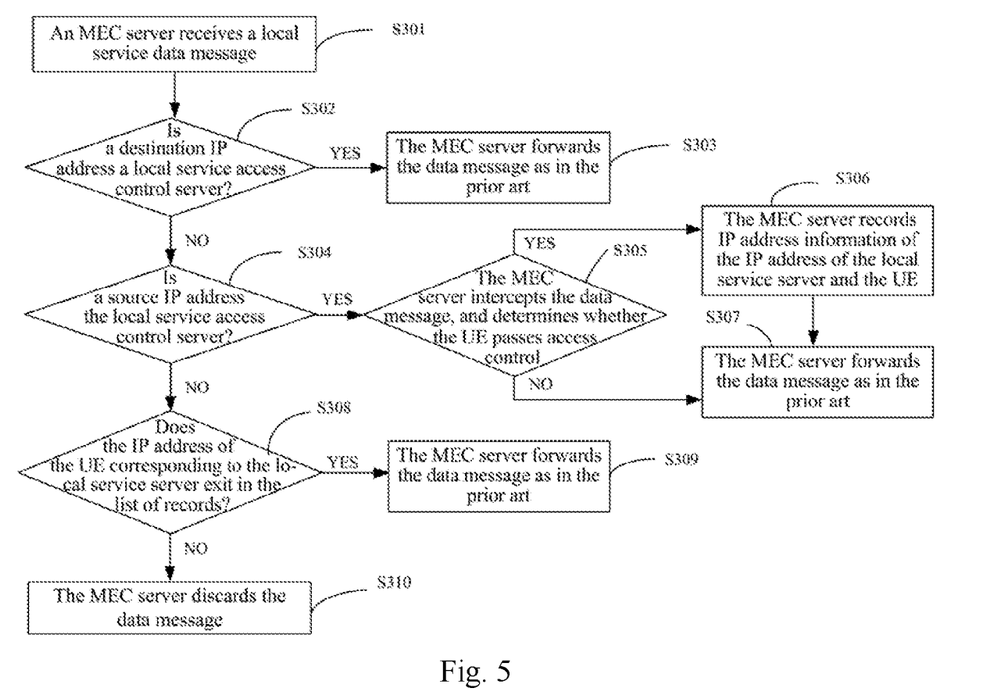
FIG. 5 is a schematic flow chart of processing by an MEC server a local service data message according to an embodiment of the invention.

Referring to FIG. 5 which is a schematic flow chart of processing by an MEC server a local service data message according to an embodiment of the invention, the flow includes the following steps.

S301. An MEC server determines that a local service data message is received.

Here, the local service data message can be a local service access request message transmitted by a UE, or can be a feedback message, transmitted by a local service access control server, to a local service access request message, for example.

S302. The MEC server determines whether a destination IP address in the data message is the IP address of a local service access control server, and if so, then the flow will proceed to the step S303; otherwise, the flow will proceed to the step S304.

S303. The MEC server forwards the data message as in the prior art.

Stated otherwise, the MEC server forwards the service data message to the local service access control server.

S304. The MEC server determines whether a source IP address in the data message is the IP address of the local service access control server, and if so, then the flow will proceed to the step S305; otherwise, the flow will proceed to the step S308.

Stated otherwise, if the source IP address in the data message is the IP address of the local service access control server, then the data message will be a feedback message to be transmitted to the UE, and if the local service access control server determines that the UE has a privilege to access some local service, then the feedback message will include the IP address of a local service server corresponding to the local service; and if the local service access control server determines that the UE has no privilege to access the local service, then the feedback message will include information indicating that the UE fails to request an access of the local service.

S305. The MEC server intercepts the data message, and determines whether the UE passes access control, and if so, then the flow will proceed to the step S306; otherwise, the flow will proceed to the step S307.

Here, it is determined whether the UE passes access control, that is, whether the UE has a privilege to access the local service to be accessed by the requesting UE, and if so, then it will indicate that the UE has a privilege to access the local service to be accessed by the requesting UE; otherwise, it will indicate that the UE has no privilege to access the local service to be accessed by the requesting UE.

S306. The MEC server records a correspondence relationship between the IP address of the local service server corresponding to the local service to be accessed by the requesting UE, and the IP address of the UE.

S307. The MEC server forwards the data message as in the prior art.

Stated otherwise, if it is determined that the UE does not pass access control, then the data message will be forwarded directly to the UE without making any record.

S308. The MEC server determines whether the IP address of the UE, and the IP address of the local service server corresponding to the local service to be accessed by the requesting UE are stored in a pre-stored IP address information correspondence relationship table, and if so, then the flow will proceed to the step S309; otherwise, the flow will proceed to the step S310.

Stated otherwise, it is determined whether the IP address of the UE corresponding to the local service server exists in the list of records.

S309. The MEC server forwards the data message as in the prior art.

Stated otherwise, the MEC server forwards the local service data message to the corresponding local service server.

S310. The MEC server discards the local service data message.

Figure 6:
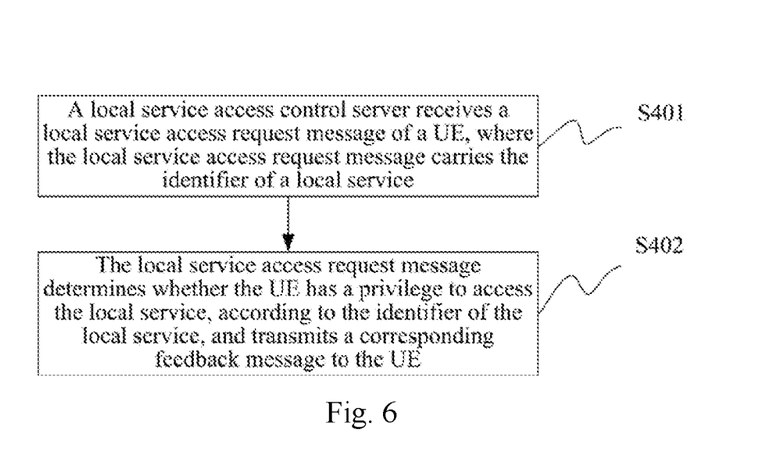
FIG. 6 is a schematic flow chart of another service access control method according to an embodiment of the invention.

Referring to FIG. 6, a service access control method according to an embodiment of the invention at the local service access control server side includes the following steps:

S401. A local service access control server receives a local service access request message of a UE, where the local service access request message carries the identifier of a local service; and S402. The local service access control server determines whether the UE has a privilege to access the local service, according to the identifier of the local service, and transmits a corresponding feedback message to the UE.

Preferably, the local service access control server receives the local service access request message of the UE as follows:

the local service access control server receives the local service access request message of the UE forwarded by a Mobile Edge Computing (MEC) server.

Preferably, the local service access control server determines whether the UE has a privilege to access the local service, according to the identifier of the local service as follows:

the local service access control server refers to preconfigured local service related information, and determines whether a local service server corresponding to the identifier of the local service needs to control an access of any UE; and when the local service server corresponding to the identifier of the local service does not need to control an access of any UE, the local service access control server determines that the UE has a privilege to access the local service.

Here, the preconfigured local service related information can be as depicted in Table 1 above.

Preferably, the local service access control server further determines whether the UE has a privilege to access the local service, according to the identifier of the local service as follows:

when the local service server corresponding to the identifier of the local service needs to control an access of any UE, the local service access control server refers to a list, of UEs allowed to access the local service, corresponding to the local service server in the preconfigured information, and when the identifier of the UE exists in the list of UEs allowed to access the local service, the local service access control server determines that the UE has a privilege to access the local service.

Preferably, when it is determined that the UE has a privilege to access the local service, the feedback message includes the IP address of the local service server corresponding to the local service; and when it is determined that the UE has no privilege to access the local service, the feedback message includes information indicating that the UE fails to request an access of the local service.

Preferably, the local service access control server transmits the corresponding feedback message to the UE as follows:

the local service access control server transmits the feedback message to an MEC server, and the MEC server forwards the feedback message to the UE.

Apparatuses corresponding to the service access method and the service access control method above will be introduced below.

Figure 7:
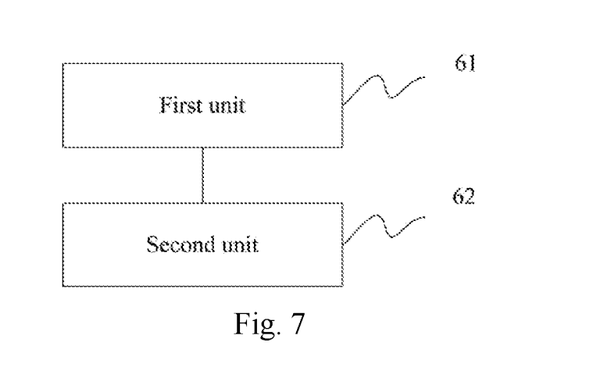
FIG. 7 is a schematic structural diagram of a service access apparatus according to an embodiment of the invention.

Referring to FIG. 7, a service access apparatus at the UE side according to an embodiment of the invention includes:

a first unit 61 is configured to determine a local service to be accessed; and a second unit 62 is configured to transmit a local service access request message to a local service access control server, so that the local service access control server determines whether the UE has a privilege to access the local service, where the local service access request message carries the identifier of the local service.

Preferably, the local service access request message further carries the identifier of the UE.

Preferably, the second unit 62 is configured:

to transmit the local service access request message to a Mobile Edge Computing (MEC) server, so that the MEC server transmits the local service access request message of the UE to the local service access control server.

Preferably, after the local service access request message is transmitted to the local service access control server, the second unit 62 is further configured to receive a feedback message transmitted by the local service access control server; and when the UE has a privilege to access the local service, the feedback message includes the IP address of a local service server corresponding to the local service, or when the UE has no privilege to access the local service, the feedback message includes information indicating that the UE fails to request an access of the local service.

Preferably, the second unit 62 is further configured:

when the received feedback message includes the IP address of the local service server corresponding to the local service, to access the local service according to the IP address of the local service server.

Figure 8:
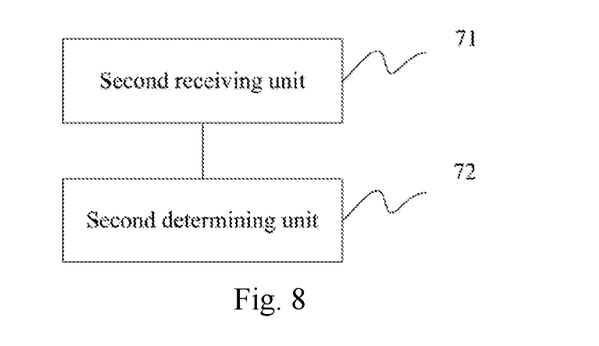
FIG. 8 is a schematic structural diagram of a service access control apparatus according to an embodiment of the invention.

Referring to FIG. 8, a service access control apparatus at the MEC server side according to an embodiment of the invention includes:

a second receiving unit 71 is configured to receive a data message transmitted by a User Equipment (UE) to access a local service, and to obtain a destination IP address carried in the request message to access the local service; and a second determining unit 72 is configured to transmit the data message to a local service access control server upon determining that the destination IP address is the IP address of the local service access control server, so that the local service access control server determines whether the UE has a privilege to access the local service.

Preferably, after the data message is transmitted to the local service access control server, the second determining unit 72 is further configured:

to receive a data message transmitted by the local service access control server to be fed back to the UE; and to determine whether the UE has a privilege to access the local service, according to the data message to be fed back to the UE, and to record a correspondence relationship between IP address information of a local service server corresponding to the local service, and IP address information of the UE, and to transmit the data message, to be fed back to the UE, to the UE, upon determining that the UE has a privilege to access the local service.

Preferably, when the UE has a privilege to access the local service, the data message to be fed back to the UE includes the IP address of the local service server corresponding to the local service; or when the UE has no privilege to access the local service, the data message to be fed back to the UE includes information indicating that the UE fails to request an access of the local service.

Preferably, the second determining unit 72 is further configured:

when the destination IP address carried in the data message, transmitted by the UE to access the local service, received by the second receiving unit 71 is the IP address of the local service access control server, to determine whether the UE has passed access control by the local service server, and to perform corresponding processing on the data message transmitted by the UE to access the local service.

Preferably, the second determining unit 72 is configured to determine whether the UE has passed access control by the local service server, and to perform corresponding processing on the data message transmitted by the UE to access the local service by:

determining whether there is a pre-stored correspondence relationship between the IP address of the local service server, and the IP address of the UE, and if there is a pre-stored correspondence relationship between the IP address of the local service server, and the IP address of the UE, determining that the UE has passed access control by the local service server, and transmitting the data message, transmitted by the UE to access the local service, to the local service server; otherwise, discarding the data message transmitted by the UE to access the local service.

Figure 9:
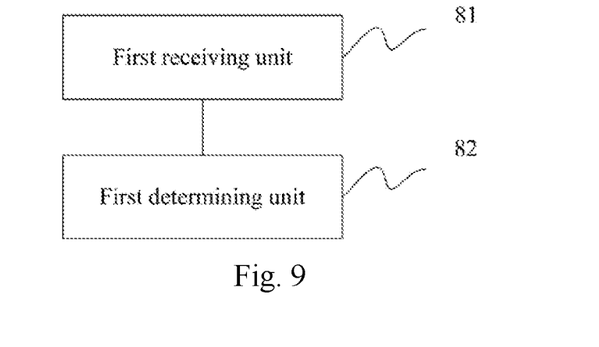
FIG. 9 is a schematic structural diagram of another service access control apparatus according to an embodiment of the invention.

Referring to FIG. 9, a service access control apparatus according to an embodiment of the invention at the local service access control server side includes:

a first receiving unit 81 is configured to receive a local service access request message of a User Equipment (UE), where the local service access request message carries the identifier of a local service; and a first determining unit 82 is configured to determine whether the UE has a privilege to access the local service, according to the identifier of the local service, and to transmit a corresponding feedback message to the UE.

Preferably, the first receiving unit 81 is configured:

to receive the local service access request message of the UE forwarded by a Mobile Edge Computing (MEC) server.

Preferably, the first determining unit is configured to determine whether the UE has a privilege to access the local service, according to the identifier of the local service by:

referring to preconfigured local service related information, to determine whether a local service server corresponding to the identifier of the local service needs to control an access of any UE; and when the local service server corresponding to the identifier of the local service does not need to control an access of any UE, determining that the UE has a privilege to access the local service.

Preferably, the first determining unit is configured to determine whether the UE has a privilege to access the local service, according to the identifier of the local service by:

when the local service server corresponding to the identifier of the local service needs to control an access of any UE, to refer to a list, of UEs allowed to access the local service, corresponding to the local service server in the preconfigured information, and when the identifier of the UE exists in the list of UEs allowed to access the local service, to determine that the UE has a privilege to access the local service.

Preferably, when the first determining unit 82 determines that the UE has a privilege to access the local service, the feedback message includes the IP address of the local service server corresponding to the local service; and when the first determining unit determines that the UE has no privilege to access the local service, the feedback message includes information indicating that the UE fails to request an access of the local service.

Preferably, the first determining unit 82 is configured to transmit the corresponding feedback message to the UE by:

transmitting the feedback message to an MEC server, so that the MEC server forwards the feedback message to the UE.

The respective functional units in the embodiments of the invention can be embodied as particular hardware processors, or other physical devices.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A service access control method, comprising:
receiving, by a local service access control server, a local service access request message of a User Equipment (UE) forwarded by a Mobile Edge Computing (MEC) server, the local service access request message carries an identifier of a local service, and the local service access control server is deployed on an access network side close to a mobile edge; and
determining, by the local service access control server without a core network, whether the UE has a privilege to access the local service, according to the identifier of the local service, and transmitting a corresponding feedback message to the UE, the determining, by the local service access control server, whether the UE has a privilege to access the local service, according to the identifier of the local service comprises:
referring, by the local service access control server, to preconfigured local service related information to determine whether a local service server corresponding to the identifier of the local service needs to control a UE access, and
when the local service server corresponding to the identifier of the local service does not need to control the UE access, determining, by the local service access control server, that the UE has a privilege to access the local service;
wherein the method further comprises:
in response to that the local service access request message server carries an IP address of the local service server, determining, by the MEC server, whether the UE has passed access control by the local service access control server, and performing corresponding processing on the data message transmitted by the UE.

2. The method according to claim 1, wherein determining, by the local service access control server, whether the UE has a privilege to access the local service, according to the identifier of the local service further comprises:
when the local service server corresponding to the identifier of the local service needs to control the UE access, referring, by the local service access control server, to a list, of UEs allowed to access the local service, corresponding to the local service server in the preconfigured information, and when the identifier of the UE exists in the list of UEs allowed to access the local service, determining, by the local service access control server, that the UE has a privilege to access the local service.

3. The method according to claim 1, wherein when it is determined that the UE has a privilege to access the local service, the feedback message comprises the IP address of a local service server corresponding to the local service; when it is determined that the UE has no privilege to access the local service, the feedback message comprises information indicating that the UE fails to request an access of the local service.

4. The method according to claim 1, wherein transmitting, by the local service access control server, the corresponding feedback message to the UE comprises:
transmitting, by the local service access control server, the feedback message to an MEC server, so that the MEC server forwards the feedback message to the UE.

5. A service access control method, comprising:
receiving, by a Mobile Edge Computing (MEC) server, a data message transmitted by a User Equipment (UE) to access a local service, and obtaining a destination IP address carried in the request message to access the local service; and
transmitting, by the MEC server, the data message to a local service access control server upon determining that the destination IP address is the IP address of the local service access control server, so that the local service access control server without a core network determines whether the UE has a privilege to access the local service by referring to preconfigured local service related information to determine whether a local service server corresponding to the identifier of the local service needs to control a UE access, when the local service server corresponding to the identifier of the local service does not need to control the UE access, determining, that the UE has a privilege to access the local service,
the method further comprises:
when the destination IP address carried in the data message, transmitted by the UE, received by the MEC server is the IP address of the local service access control server, determining, by the MEC server, whether the UE has passed access control by the local service server, and performing corresponding processing on the data message transmitted by the UE;
the local service access control server is deployed on an access network side close to a mobile edge.

6. The method according to claim 5, wherein after the MEC server transmits the data message to the local service access control server, the method further comprises:
receiving, by the MEC server, a data message transmitted by the local service access control server to be fed back to the UE; and
determining, by the MEC server, whether the UE has a privilege to access the local service, according to the data message to be fed back to the UE, and recording a correspondence relationship between IP address information of a local service server corresponding to the local service, and IP address information of the UE, and transmitting the data message, to be fed back to the UE, to the UE, upon determining that the UE has a privilege to access the local service.

7. The method according to claim 6, wherein when the UE has a privilege to access the local service, the data message to be fed back to the UE comprises the IP address of the local service server corresponding to the local service; or when the UE has no privilege to access the local service, the data message to be fed back to the UE comprises information indicating that the UE fails to request an access of the local service.

8. The method according to claim 5, wherein when the destination IP address carried in the data message, transmitted by the UE, received by the MEC server is the IP address of the local service access control server, determining, by the MEC server, whether the UE has passed access control by the local service server, and performing corresponding processing on the data message transmitted by the UE comprises:
when the destination IP address carried in the data message, transmitted by the UE, received by the MEC server is the IP address of the local service access control server, determining, by the MEC server, whether there is a pre-stored correspondence relationship between the IP address of the local service server, and the IP address of the UE, and if there is a pre-stored correspondence relationship between the IP address of the local service server, and the IP address of the UE, then determining that the UE has passed access control by the local service server, and transmitting the data message, transmitted by the UE, to the local service server; otherwise, discarding the data message transmitted by the UE.

9. A service access method, comprising:
determining, by a User Equipment (UE), a local service to be accessed; and
transmitting, by the UE, a local service access request message to a local service access control server, so that the local service access control server without a core network determines whether the UE has a privilege to access the local service by referring to preconfigured local service related information to determine whether a local service server corresponding to an identifier of the local service needs to control a UE access, when the local service server corresponding to the identifier of the local service does not need to control the UE access, determining, that the UE has a privilege to access the local service, the local service access request message carries the identifier of the local service, the local service access control server is deployed on an access network side close to a mobile edge;
wherein the transmitting, by the UE, a local service access request message comprises:
transmitting, by the UE, the local service access request message to a Mobile Edge Computing (MEC) server, so that the MEC server determines whether the UE has passed access control by the local service server, and performs corresponding processing on the data message transmitted by the UE, when a destination IP address carried in the local service access request message is an IP address of the local service server.

10. The method according to claim 9, wherein the local service access request message further carries an identifier of the UE.

11. The method according to claim 9, wherein after the UE transmits the local service access request message to the local service access control server, the method further comprises:
receiving a feedback message transmitted by the local service access control server; and
when the UE has a privilege to access the local service, the feedback message comprises the IP address of a local service server corresponding to the local service,
when the UE has no privilege to access the local service, the feedback message comprises information indicating that the UE fails to request an access of the local service.

12. The method according to claim 11, further comprises:
when the feedback message received by the UE comprises the IP address of a local service server corresponding to the local service, accessing, by the UE, the local service according to the IP address of the local service server.

* * * * *